(12) United States Patent
Chen et al.

(10) Patent No.: US 11,044,960 B2
(45) Date of Patent: Jun. 29, 2021

(54) WEARABLE DISPLAY DEVICE

(71) Applicant: Quanta Computer Inc., Taoyuan (TW)

(72) Inventors: Chun-Lung Chen, Taoyuan (TW);
Yuan-Peng Yu, Taoyuan (TW);
Wei-Jen Chang, Taoyuan (TW);
Hung-Chieh Wu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 90 days.

(21) Appl. No.: 16/406,785

(22) Filed: May 8, 2019

(65) Prior Publication Data

US 2020/0205498 A1 Jul. 2, 2020

(30) Foreign Application Priority Data

Dec. 27, 2018 (TW) .................................. 107147519

(51) Int. Cl.
*A42B 1/24* (2021.01)
*A42B 1/245* (2021.01)
*G02B 27/01* (2006.01)

(52) U.S. Cl.
CPC .......... *A42B 1/245* (2013.01); *G02B 27/0149* (2013.01); *G02B 2027/0159* (2013.01); *G02B 2027/0169* (2013.01)

(58) Field of Classification Search
CPC ........... A42B 1/245; A42B 3/042; A42B 1/24; A42B 1/247; A42B 1/242; G02B 2027/0159; G02B 2027/0169; G02B 27/0149

USPC .......................................................... 224/181
See application file for complete search history.

(56) References Cited

U.S. PATENT DOCUMENTS

| 4,681,413 A | * | 7/1987 | Schmidt ................. | A61B 3/132 351/156 |
| 4,724,546 A | * | 2/1988 | Cumbie, Jr. ........... | A42B 1/247 2/12 |
| 5,052,054 A | * | 10/1991 | Birum ..................... | A42C 5/02 2/10 |

FOREIGN PATENT DOCUMENTS

| CN | 207937687 U | 10/2018 |
| CN | 108873335 A | 11/2018 |
| CN | 208080617 U | 11/2018 |

* cited by examiner

*Primary Examiner* — Nathan J Newhouse
*Assistant Examiner* — Matthew T Theis
(74) *Attorney, Agent, or Firm* — Rabin & Berdo, P.C.

(57) ABSTRACT

A wearable display device includes a wearing device, a fixed frame, a sliding member, a bracket and an optical imaging device. The fixed frame is fixedly connected to the wearing device. The sliding member is slidably coupled to the fixed frame. The bracket is pivotally connected to the sliding member and is interlocked with the sliding member. The optical imaging device is fixedly connected to the bracket for sliding and rotating relative to the fixed frame.

8 Claims, 10 Drawing Sheets

WEARABLE DISPLAY DEVICE

RELATED APPLICATIONS

This application claims priority to Taiwan Application Serial Number 107147519, filed Dec. 27, 2018, which is herein incorporated by reference.

BACKGROUND

Field of Disclosure

The disclosure relates to a wearing device. More particularly, the disclosure relates to a wearable display device.

Description of Related Art

With the improvement of technology, a wearable display device for Augmented Reality (AR) has been gradually popular in the marketplace. Normally, the wearable display device includes an optical imaging device. The user can see display images through the optical imaging device.

However, the current optical imaging device is fixedly arranged in front of the user's eyes, and is unable to be adjusted the position in accordance to the user's eyes.

SUMMARY

In one embodiment of the disclosure, a wearable display device is provided for solving the problems mentioned in the prior art.

In one embodiment of the disclosure, the wearable display device includes a wearing device, a fixed frame, a sliding member, a bracket and an optical imaging device. The fixed frame is fixedly coupled to the wearing device. The sliding member is slidably coupled to the fixed frame. The bracket is pivotally connected to the sliding member, and collectively moved with the sliding member. The optical imaging device is fixedly connected to the bracket for sliding and rotating relative to the fixed frame.

According to one or more embodiments of the disclosure, in the wearable display device, the wearing device includes a wearing portion and a hat body. The hat body is connected to the wearing portion, and is provided with a hat brim portion and an opening formed on the hat brim portion. The fixed frame is fixedly connected to a position of the hat brim portion corresponding to the opening, and the optical imaging device is projected outwards from the hat brim portion through the opening.

According to one or more embodiments of the disclosure, in the wearable display device, the fixed frame includes an elongated sliding groove. The sliding member includes a sliding block slidably connected within the elongated sliding groove.

According to one or more embodiments of the disclosure, in the wearable display device, the elongated sliding groove is formed with a curved inner wall therein such that the sliding block is slidable along the curved inner wall.

According to one or more embodiments of the disclosure, in the wearable display device, when the sliding block moves from one of two opposite ends of the curved inner wall to the other of the two opposite ends of the curved inner wall, a maximum radian of the optical imaging device sliding along the sliding member is 10°-30°.

According to one or more embodiments of the disclosure, in the wearable display device, the hat brim portion is formed with an accommodating recess therein, and the accommodating recess is in communication with the opening. The optical imaging device is able to be completely received into the accommodating recess via the opening through the sliding member.

According to one or more embodiments of the disclosure, in the wearable display device, the sliding member further comprises a shaft-received slot. The bracket is provided with a pivot portion, and the pivot portion is rotatably disposed within the shaft-received slot, and the pivot portion is tightly fitted in the shaft-received slot.

According to one or more embodiments of the disclosure, in the wearable display device, the sliding member further includes a position-limited slot. The position-limited slot is located on one side of the shaft-received slot, and is in communication with the shaft-received slot. The bracket further includes a position-limited rib. The position-limited rib is connected to the pivot portion, and the position-limited rib extends into the position-limited slot. A volume of the position-limited rib is less than a volume of the position-limited slot.

According to one or more embodiments of the disclosure, in the wearable display device, when the position-limited rib is rotated from one inner wall of the position-limited slot to the other inner wall of the position-limited slot with the pivot portion collectively, the maximum angle of rotation of the optical imaging device with the bracket relative to the sliding member is 20°-40°.

According to one or more embodiments of the disclosure, in the wearable display device, the fixed frame is formed with a receiving slot, and the optical imaging device is telescopically disposed in the receiving slot.

With the structure described in the above embodiments, the wearable display device is correspondingly adjustable for the user in accordance to the user's eyes, thereby increasing the willingness of user to use the device.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
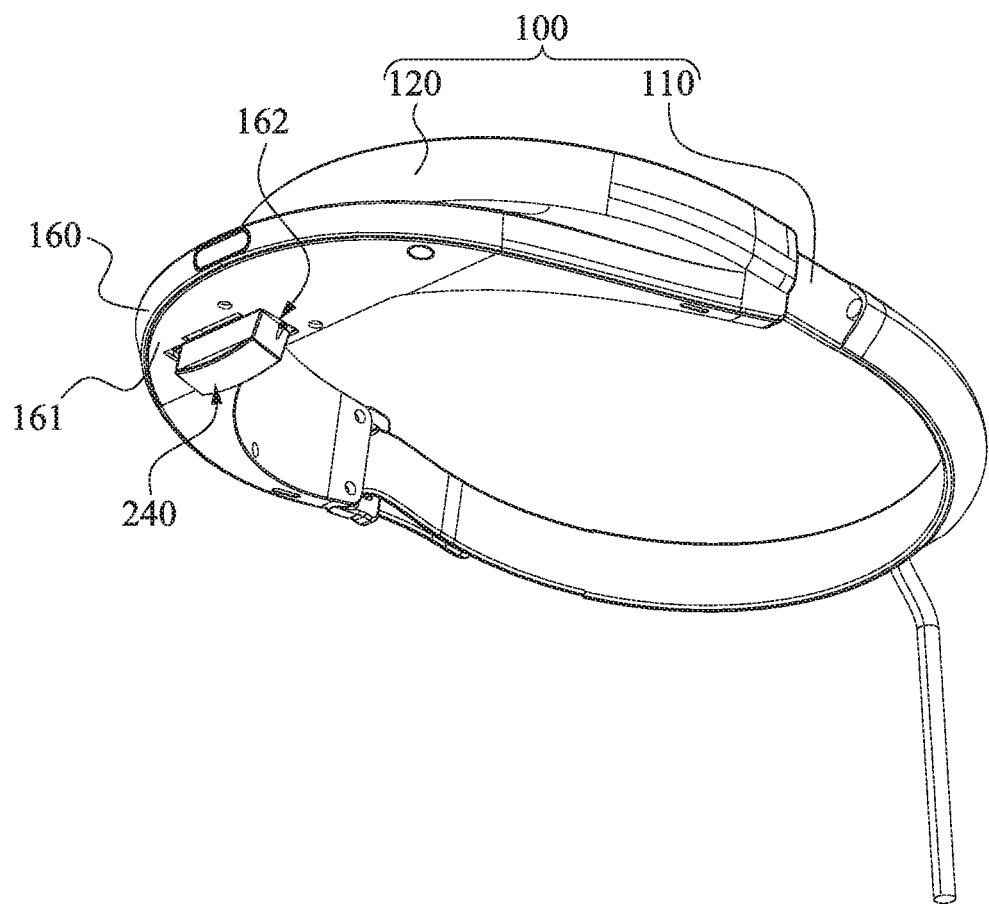
FIG. 1 is a perspective view of a wearable display device according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
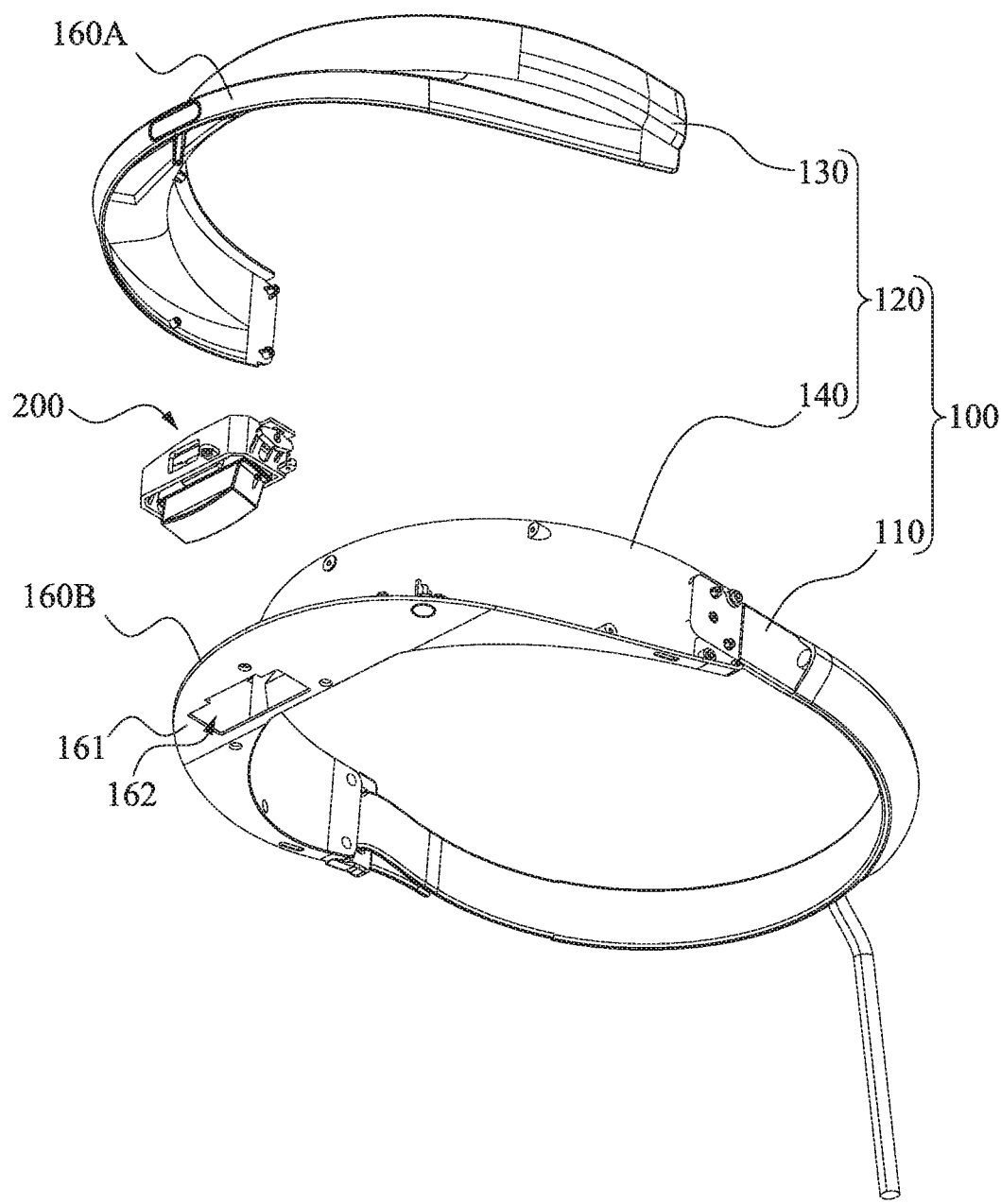
FIG. 2 is an exploded view of the wearable display device of FIG. 1.
Figure 3:
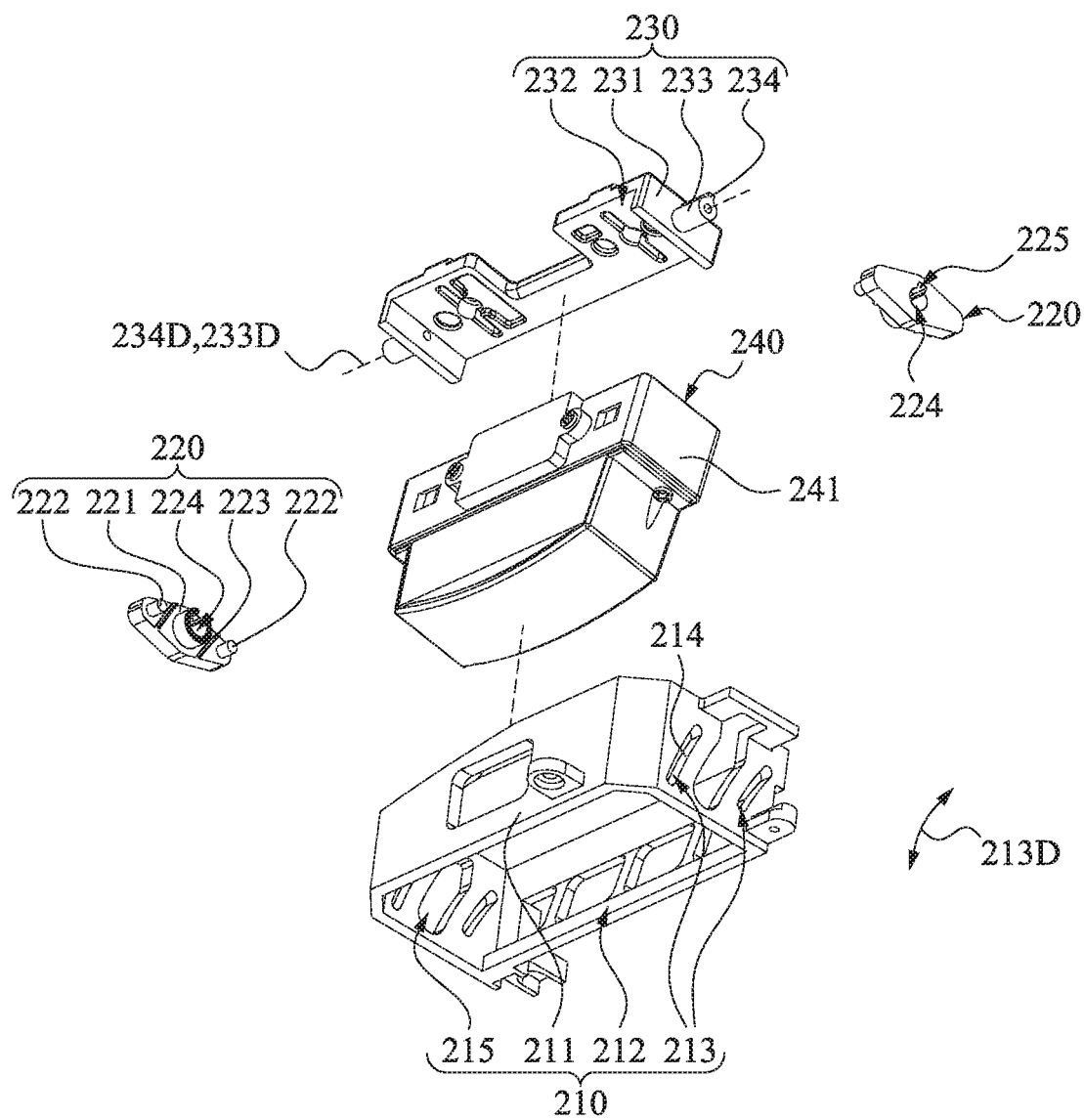
FIG. 3 is an exploded view of the device-linkage assembly of FIG. 2.

Reference is now made to FIG. 1 to FIG. 3, in which FIG. 1 is a perspective view of a wearable display device 10 according to one embodiment of the disclosure, FIG. 2 is an exploded view of the wearable display device 10 of FIG. 1, and FIG. 3 is an exploded view of the device-linkage assembly 200 of FIG. 2. As shown in FIG. 1 to FIG. 3, the wearable display device 10 includes a wearing device 100 and a device-linkage assembly 200. The wearing device 100 is used to be worn on a user. The device-linkage assembly 200 includes a fixed frame 210, one or more (e.g., two) sliding members 220, a bracket 230 and an optical imaging device 240. The fixed frame 210 is fixedly coupled to the wearing device 100. These sliding members 220 are located at two opposite sides of the fixed frame 210, and are slidably coupled to the fixed frame 210. Two opposite ends of the bracket 230 are pivotally connected to the sliding members 220, respectively, and each of the opposite ends of the bracket 230 is collectively moved with one of the sliding members 220 on the fixed frame 210. The optical imaging device 240 is fixedly connected to the bracket 230. Thus, the optical imaging device 240 can be slid and rotated relative to the fixed frame 210 by the bracket 230 on the fixed frame 210. Therefore, the optical imaging device 240 can be adjusted by the user in accordance to the user's eyes, thereby increasing the willingness of user to use the device.

In this embodiment, the wearing device 100 is used to be worn on a user's head. For example, the wearing device 100 can be a visor cap that reveals the top of the user's head. However, the disclosure is not limited thereto. In other embodiments, the wearing device may also be a baseball cap that covers the top of the user's head. Specifically, the wearing device 100 includes a wearing portion 110 and a hat body 120. The hat body 120 is connected to the wearing portion 110, and the wearing portion 110 for example is a strip body. The hat body 120 is provided with a hat brim portion 160 that includes an upper hat brim 160A and a lower hat brim 160B. The lower hat brim 160B includes a bottom surface 161 on which an opening 162 is formed. The fixed frame 210 is fixedly connected to a position of the hat brim portion 160 corresponding to the opening 162, and the optical imaging device 240 is projected outwards from the bottom surface 161 of the hat brim portion 160 through the opening 162.

For example, the hat body 120 includes an upper case 130 and a lower case 140. The upper case 130 and the lower case 140 are able to combine with each other. The upper hat brim 160A is connected to the upper case 130, and the lower hat brim 160B is connected to the lower case 140. An accommodating recess 150 (FIG. 4A) being in communication with the opening 162 described above is defined between the upper hat brim 160A and the lower hat brim 160B. The device-linkage assembly 200 is located in the accommodating recess 150 in which the fixed frame 210 is fixedly screwed to the inner sides of the upper case 130 and the lower case 140 to cover the opening 162. Thus, the optical imaging device 240 is movably slidable in the opening 162, and partially projected outwards from the bottom surface 161 of the hat brim portion 160 via the opening 162 described above.

Figure 4A:
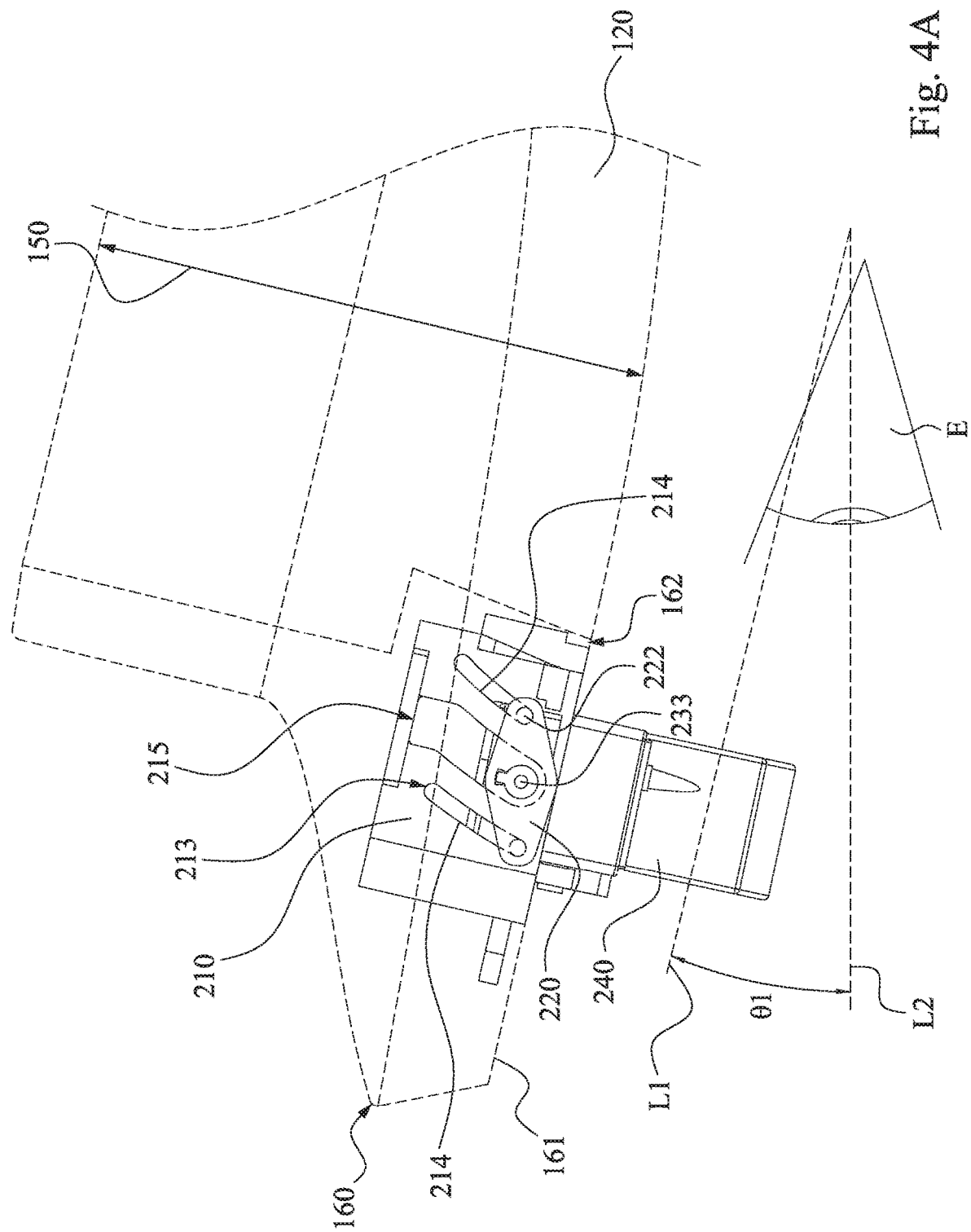
FIG. 4A and FIG. 4B respectively are schematic operational views of the optical imaging device of FIG. 2.
Figure 4B:
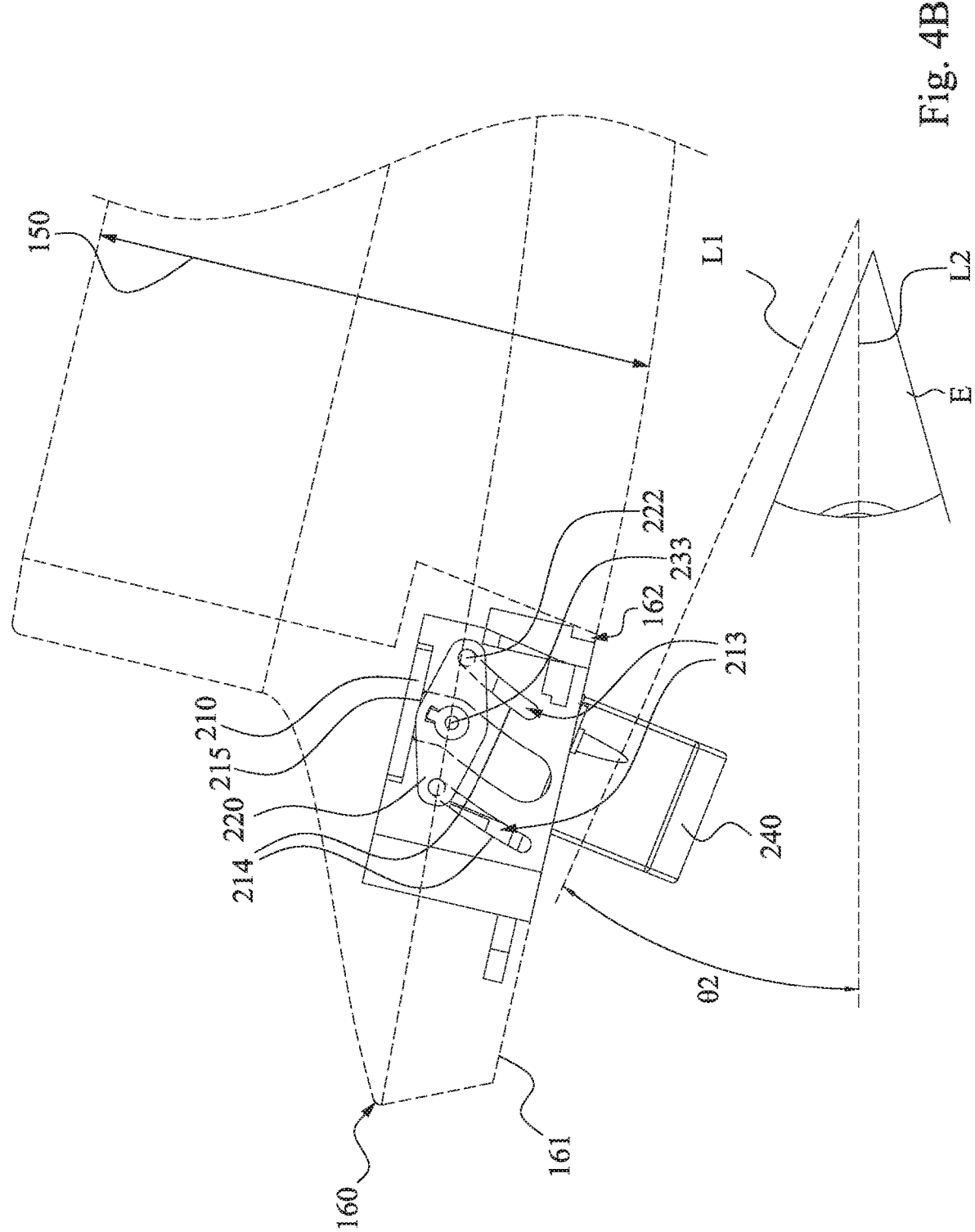

FIG. 4A and FIG. 4B respectively are schematic operational views of the optical imaging device 240 of FIG. 2. As shown in FIG. 3 and FIG. 4A, the fixed frame 210 includes a frame body 211 and a plurality of elongated sliding grooves 213. The elongated sliding grooves 213 are respectively formed on two opposite sides of the frame body 211. Each of the sliding members 220 includes a main body 221 and one or more (e.g., two) sliding blocks 222 protrusively formed on one surface of the main body 221. Each of the sliding blocks 222 of each sliding member 220 is slidably connected within one of the elongated sliding grooves 213 (FIG. 4A). Furthermore, the fixed frame 210 is formed with a receiving slot 212. The receiving slot 212 is disposed within the frame body 211, and is in communication with the elongated sliding grooves 213, and the optical imaging device 240 is telescopically disposed in the receiving slot 212.

Therefore, the optical imaging device 240 is able to be slid out of the opening 162 of the wearing device 100. Since an extension direction 213D (FIGS. 2 and 3) of each of the elongated sliding grooves 213 substantially passes through the bottom surface 161 of the hat brim portion 160, the optical imaging device 240 is able to be moved out of the opening 162 of the wearing device 100 with the movement of the sliding members 220. More specifically, each of the sliding members 220 includes at least one linear protruding flange 223. The linear protruding flange 223 is convexly formed on one surface of the main body 221 which is the same to the surface on which the sliding blocks 222 is formed. When the sliding members 220 are slid relative to the fixed frame 210, since the sliding members 220 are in linear contact with the frame body 211 of the fixed frame 210 through the linear protruding flanges 223, the sliding smoothness of the sliding member 220 relative to the fixed frame 210 can be improved.

More specifically, in the embodiment, as shown in FIG. 3 to FIG. 4A, each of the elongated sliding grooves 213 is in a curved shape or a C-typed shape. For example, each of the elongated sliding grooves 213 is formed with a curved inner wall 214 therein, and each of the sliding blocks 222 can be slid in one of the elongated sliding grooves 213 so as to move from one end of the curved inner wall 214 to the other end of the curved inner wall 214. Thus, the optical imaging device 240 can be slid out of the opening 162 described above according to a curvedly moving direction (e.g., extension direction 213D).

Exemplarily, when the optical imaging device 240 is partially pulled out of the receiving slot 212 of the wearing device 100 via the opening 162, so that each of the sliding blocks 222 is therefore moved from one end (e.g., upper end) of the curved inner wall 214 to the other end (e.g., lower end) of the curved inner wall 214, a maximum radian that the optical imaging device 240 can be slid by the sliding members 220 is 10°-30°. That is, a maximum included angle θ1 defined between the optical axis L1 of the optical imaging device 240 and the eye axis L2 of the human eye E is 10° to 30°, and more precisely, the maximum angle θ1, for example, is 12°. It is noted, the eye axis is defined as a hypothetical line from the cornea to the center of the optic nerve and the macula of the retina.

On the contrary, as shown in FIG. 4B, when the optical imaging device 240 is pushed into the receiving slot 212 of the wearing device 100 via the opening 162, so that each of the sliding blocks 222 is therefore moved from the other end (e.g., lower end) of the curved inner wall 214 to the end (e.g., upper end) of the curved inner wall 214, a maximum included angle θ2 defined between the optical axis L1 of the optical imaging device 240 and the eye axis L2 of the human eye E is greater than the maximum included angle θ1, and more precisely, the maximum angle θ2, for example, is 22°.

Thus, by adjusting a specific length to which the optical imaging device 240 projecting outwards from the hat brim portion 160, a specific viewing angle of the user's eyes can be matchingly adjusted, thereby providing more comfortable visual experiences and increasing the willingness of user to use the device.

Figure 5:
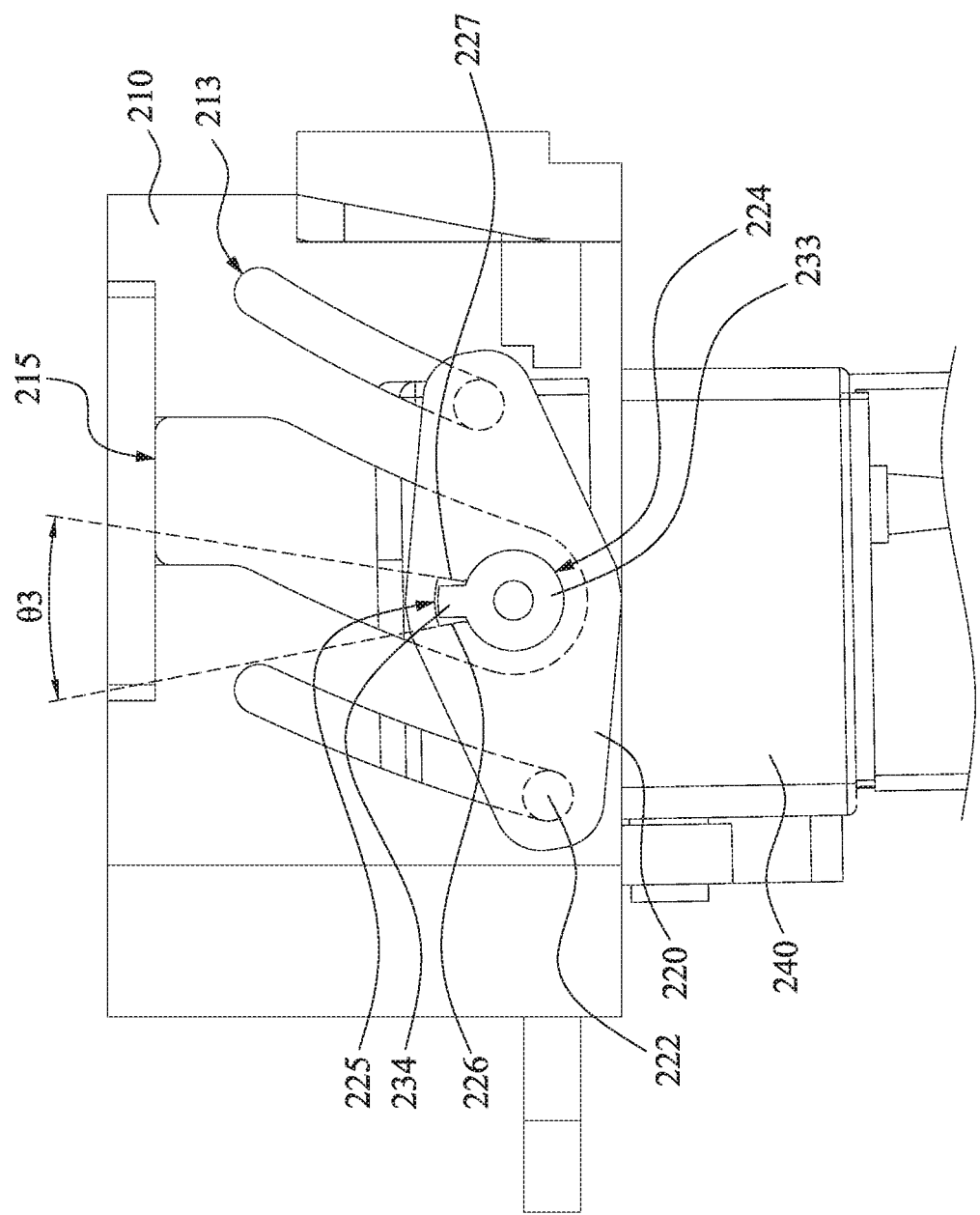
FIG. 5 is a side view of the device-linkage assembly of FIG. 2.
Figure 6A:
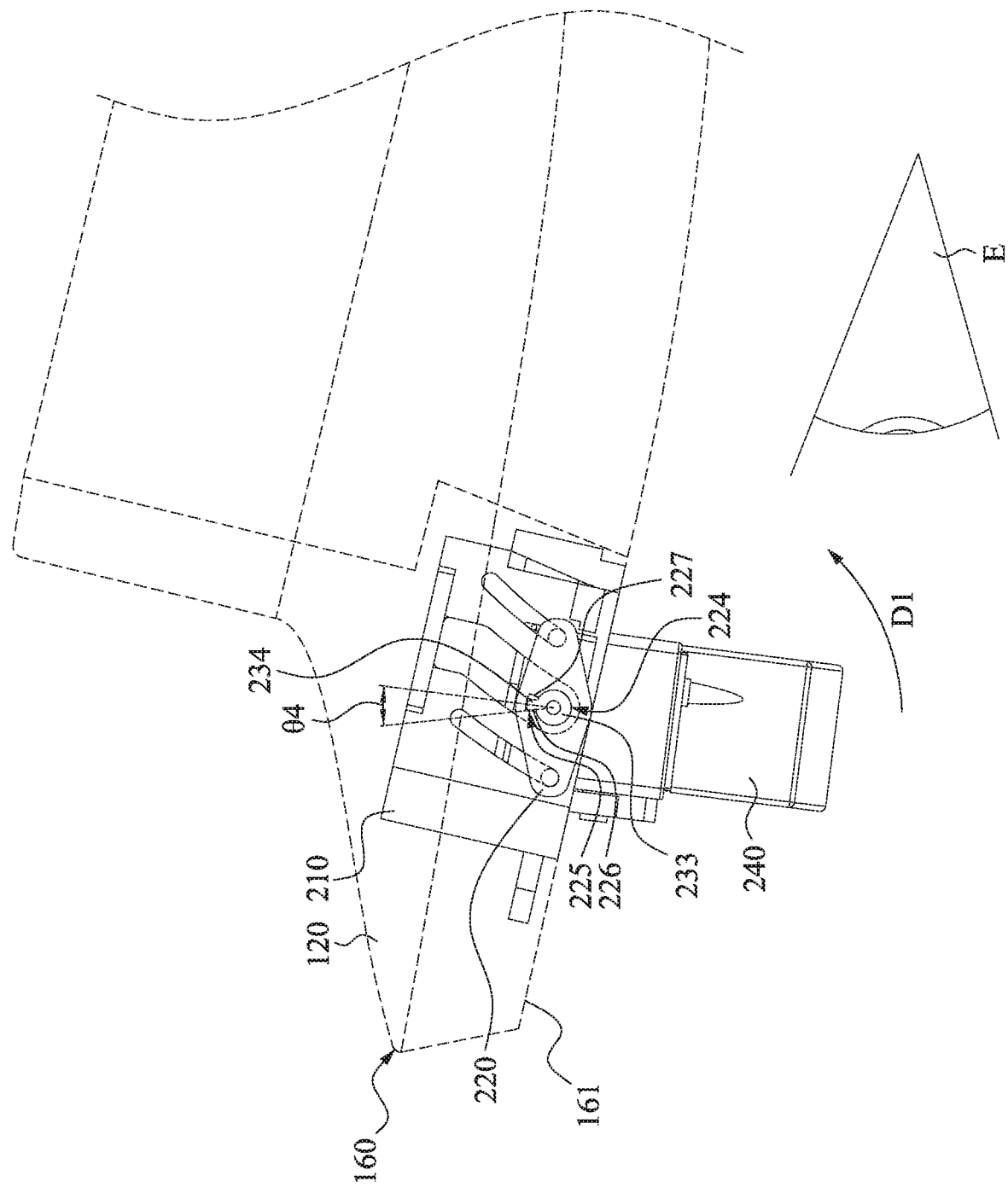
FIG. 6A and FIG. 6B respectively are schematic operational views of the optical imaging device of FIG. 2.
Figure 6B:
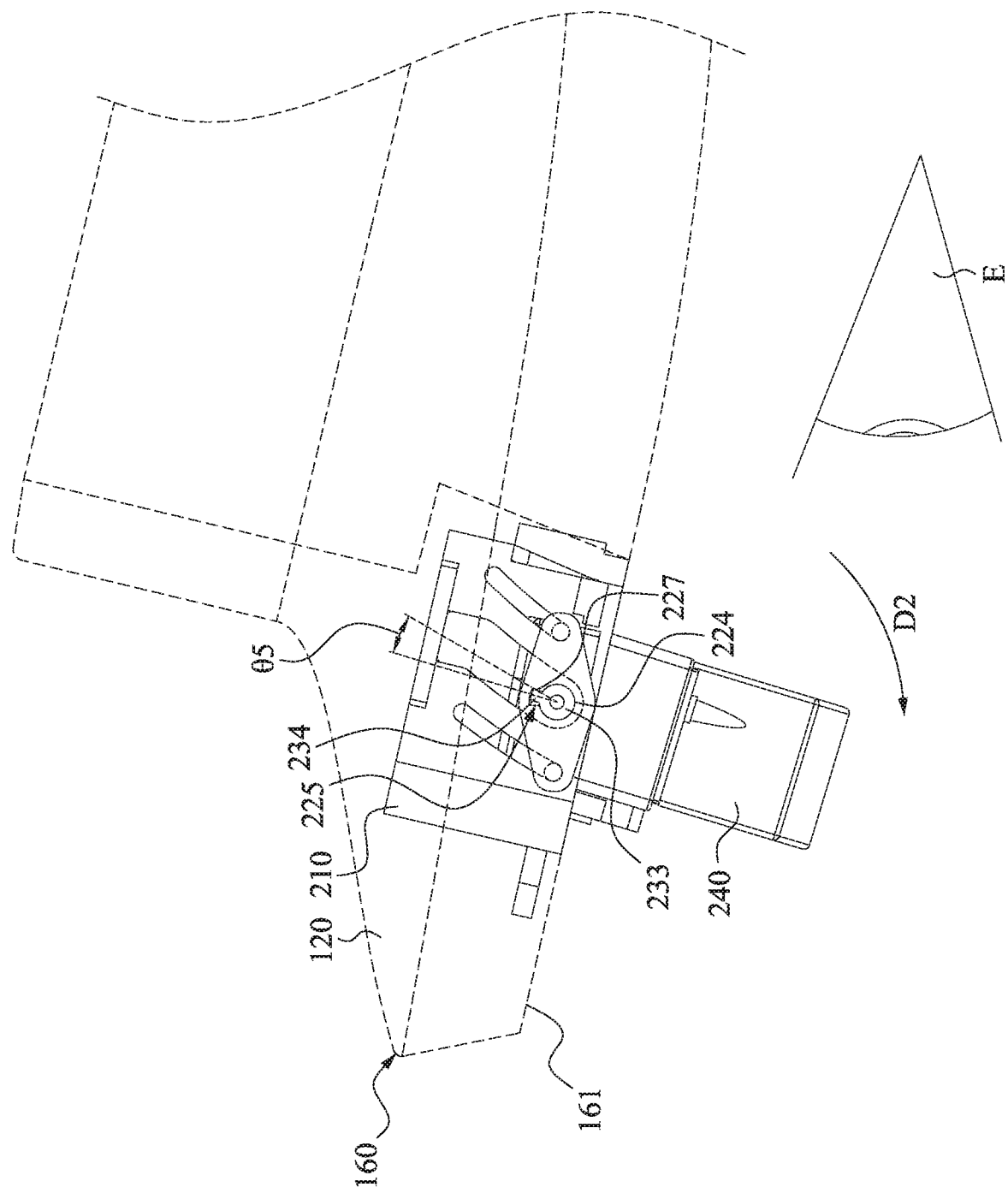

FIG. 5 is a side view of the device-linkage assembly of FIG. 2. FIG. 6A and FIG. 6B respectively are schematic operational views of the optical imaging device of FIG. 2. More specifically, as shown in FIG. 3 and FIG. 5, each of the sliding members 220 further includes a shaft-received slot 224. The shaft-received slot 224 penetrates through the main body 221, and is located between the sliding blocks 222. The bracket 230 includes a top case 231 and two pivot portions 233. One side of the top case 231 is provided with a clamp portion 232, and the clamp portion 232 is able to securely clasp the optical imaging device 240 so that the optical imaging device 240 can be moved along with the bracket 230. The pivot portions 233 are respectively disposed on two opposite ends of the top case 231, and each of the pivot portions 233 is rotatably disposed within the shaft-received slot 224. Thus, the optical imaging device 240 can be rotated in the fixed frame 210 along with the bracket 230. Also, since each of the pivot portions 233 is tightly fitted in the shaft-received slot 224, after the optical imaging device 240 is rotated in the fixed frame 210, the optical imaging device 240 can be held still in the specific inclination. Furthermore, the fixed frame 210 further includes two notches 215. The notches 215 are respectively formed on the opposite sides of the frame body 211. Each of the notches 215 is formed between two of the elongated sliding grooves 213 which disposed on the same side of the frame body 211. Each of the notches 215 is used for one of the pivot portions 233 to be slid therein.

More particularly, each of the sliding members 220 further includes a position-limited slot 225. The position-limited slot 225 penetrates through the main body 221. The position-limited slot 225 is disposed on one side of the shaft-received slot 224, and is in communication with the shaft-received slot 224. The bracket 230 further includes two position-limited ribs 234. Each of the position-limited ribs 234 is projected on one side of one of the pivot portions 233, and a major axis direction 234D of one of the position-limited ribs 234 is parallel to an axial direction 233D of the pivot portions 233. Thus, when each of the pivot portions 233 is pivotally disposed within the shaft-received slot 224 of one of the sliding members 220, the position-limited rib 234 correspondingly extends into the position-limited slot 225.

When each of the pivot portions 233 is rotated within one of the shaft-received slots 224, since the volume of the position-limited rib 234 is less than the volume of the position-limited slot 225, the position-limited rib 234 can be rotated to swing synchronously in the position-limited slot 225 with the rotation of the corresponding pivot portion 233, so that the optical imaging device 240 can rotate correspondingly within the maximum included angle θ3 to match the specific viewing angle of the user's eyes. Thereby providing more comfortable visual experiences and increasing the willingness of user to use the device.

For example, when the user rotates the optical imaging device 240 such that the position-limited rib 234 moves from the left side 226 of the position-limited slot 225 to the right side 227 of the position-limited slot 225, the optical imaging device 240 can rotate with the bracket 230 relative to the sliding members 220. The maximum included angle θ3 is 20° to 40°, and more precisely, the maximum included angle θ3, for example, is 20°.

In other words, the optical imaging device 240 can be swung towards the human eye E in the direction D1, such that the position-limited rib 234 moves to the left side 226 of the position-limited slot 225 (FIG. 6A), or the optical imaging device 240 can be swung away from the human eye E in the direction D2, such that the position-limited rib 234 moves to the right side 227 of the position-limited slot 225 (FIG. 6B). Each of rotational angles θ4 and θ5 of the optical imaging device 240 is 10°, respectively.

Figure 7:
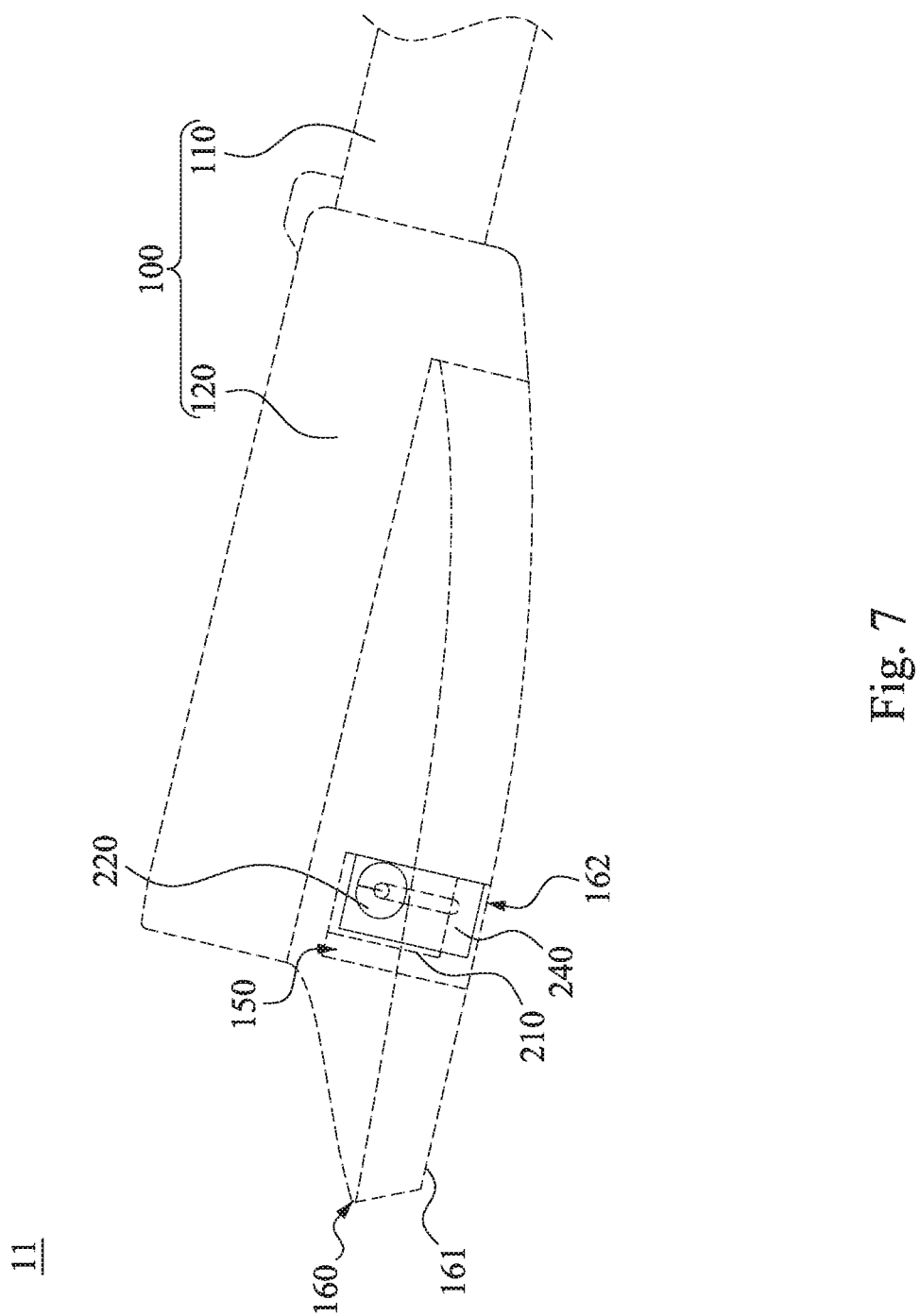
FIG. 7 is a side view of a wearable display device according to one embodiment of the disclosure.

FIG. 7 is a side view of a wearable display device 11 according to one embodiment of the disclosure. As shown FIG. 7, the wearable display device 11 of the embodiment is substantially the same to the wearable display device 10 of FIG. 1. However, at least one difference of the wearable display device 11 of FIG. 7 from the wearable display device 10 of FIG. 1 is that, when the optical imaging device 240 is pulled back into the accommodating recess 150, the optical imaging device 240 is able to be completely received into the accommodating recess 150 via the opening 162 by pushing the sliding member 220 for totally hiding the optical imaging device 240 so as to decrease the degrees of the optical imaging device 240 blocking the sight of the user's eyes.

Figure 8:
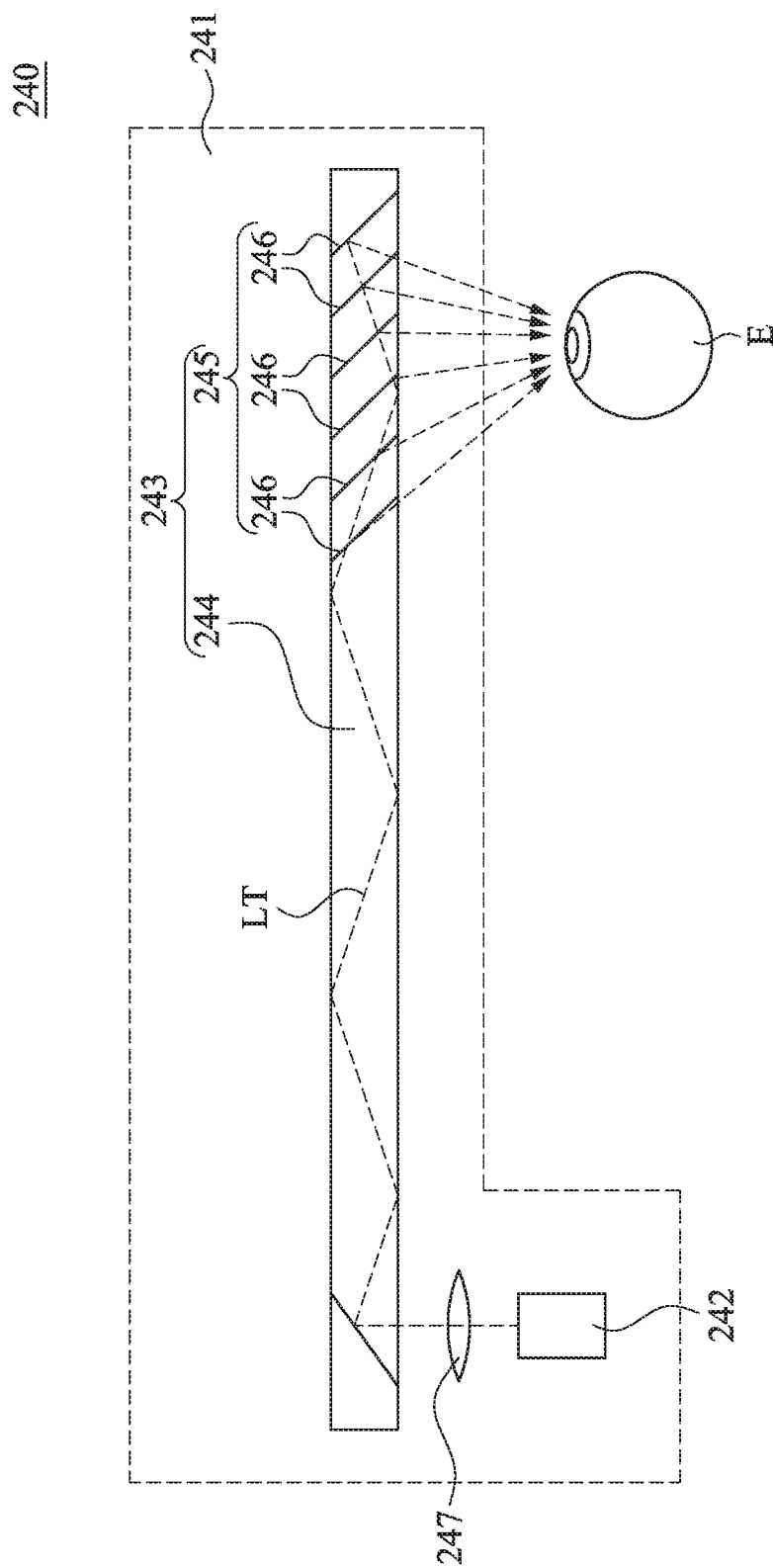
FIG. 8 is a schematic operational view of an optical imaging device according to one embodiment of the disclosure.

FIG. 8 is a schematic operational view of an optical imaging device 240 according to one embodiment of the disclosure. As shown in FIG. 8, the optical imaging device 240 described in the above embodiments includes an outer casing 241, a display source 242 and an optical element 243. The outer casing 241 is fixedly connected to the bracket 230. The display source 242 is fixedly connected to the outer casing 241. The optical element 243 includes a light-transmission plate 244 and a waveguide structure 245. The waveguide structure 245 is disposed in the light-transmission plate 244. The light-transmission plate 244 is fixedly located in the outer casing 241, and optically coupled to the display source 242 for guiding lights LT of the display source 242 to the waveguide structure 245 through the light-transmission plate 244 when the lights LT is into the light-transmission plate 244. The lights LT of the display source 242 can be transmitted into the light-transmission plate 244 via a lens 247, however, the disclosure is not limited thereto. The waveguide structure 245 is used to guide the light LT of the display source 242 away from one side of the light-transmission plate 244, and send the light LT to the user's eyes. The waveguide structure 245 is, for example, a grating structure or a plurality of reflective surfaces 246 arranged in parallel. Also, the display source 242 and the user's eyes are not limited to face to the same surface or different surfaces of the light-transmission plate 244 respectively; however, the disclosure is not limited thereto.

Therefore, when the user wears the wearable display device 10 described above, since the hat brim portion 160 is located above the user's eyes, the optical imaging device 240 located on the bottom surface 161 of the hat brim portion 160 is able to display image information such as text or graphic information above the user's field of view (FOV). Thus, the user's eye not only can directly view the actual scene in front of the user, but also view the image information through the optical imaging device 240.

In the embodiment, the optical imaging device 240 is a monocular display. The optical imaging device 240 also can be known as an LCoS (liquid crystal on silicon) display or a near-eye display (NED). For example, the size and the position of the optical imaging device 240 are designed to be suitable to align with single one of human eyes (e.g., the left eye) of the user for providing images for the specific eye only. However, the disclosure is not limited to aligning the user's left, right or both eyes. Since the size of the optical imaging device 240 is appropriate, the user's sight will not be blocked. Thus, the user's eye can view the actual scene in front of the user and the image content message of the optical imaging device 240 simultaneously.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A wearable display device, comprising:
    a wearing device comprising
        a wearing portion, and
        a hat body connected to the wearing portion and provided with a hat brim portion and an opening formed on the hat brim portion, wherein the hat brim portion is formed with an accommodating recess therein, and the accommodating recess is in communication with the opening;
    a fixed frame fixedly coupled to the wearing device, wherein the fixed frame is fixedly connected to a position of the hat brim portion corresponding to the opening;
    a sliding member slidably coupled to the fixed frame;
    a bracket pivotally connected to the sliding member, and collectively moved with the sliding member; and
    an optical imaging device fixedly connected to the bracket for sliding and rotating relative to the fixed frame and being projected outwards from the hat brim portion through the opening, wherein the optical imaging device is able to be completely received into the accommodating recess via the opening through the sliding member.

2. The wearable display device of claim 1, wherein the fixed frame comprises an elongated sliding groove, the sliding member comprises a sliding block slidably connected within the elongated sliding groove.

3. The wearable display device of claim 2, wherein the elongated sliding groove is formed with a curved inner wall therein such that the sliding block is slidable along the curved inner wall.

4. The wearable display device of claim 3, wherein when the sliding block moves from one of two opposite ends of the curved inner wall to the other of the two opposite ends of the curved inner wall, a maximum radian of the optical imaging device sliding along the sliding member is 10°-30°.

5. The wearable display device of claim 1, wherein
    the sliding member further comprises a shaft-received slot; and
    the bracket is provided with a pivot portion, and the pivot portion is rotatably disposed within the shaft-received slot, and the pivot portion is fitted in the shaft-received slot to contact with the sliding member.

6. The wearable display device of claim 5, wherein the sliding member further comprises a position-limited slot, the position-limited slot is located on one side of the shaft-received slot, and is in communication with the shaft-received slot; and
    the bracket further comprises a position-limited rib, the position-limited rib is connected to the pivot portion, and the position-limited rib extends into the position-limited slot, wherein a volume of the position-limited rib is less than a volume of the position-limited slot.

7. The wearable display device of claim 6, wherein when the position-limited rib is rotated from one inner wall of the position-limited slot to another inner wall of the position-limited slot with the pivot portion collectively, a maximum angle of rotation of the optical imaging device with the bracket relative to the sliding member is 20°-40°.

8. The wearable display device of claim 1, wherein the fixed frame is formed with a receiving slot, and the optical imaging device is telescopically disposed in the receiving slot.

* * * * *